United States Patent
Wolf

(10) Patent No.: US 10,344,966 B2
(45) Date of Patent: Jul. 9, 2019

(54) VENTED FIRE TARP

(71) Applicant: Mark Andrew Wolf, Surprise, AZ (US)

(72) Inventor: Mark Andrew Wolf, Surprise, AZ (US)

(73) Assignee: Fireside Industries, Inc., Surprise, AZ (US)

( * ) Notice: Subject to any disclaimer, the term of this patent is extended or adjusted under 35 U.S.C. 154(b) by 313 days.

(21) Appl. No.: 15/465,934

(22) Filed: Mar. 22, 2017

(65) Prior Publication Data

US 2017/0276343 A1 Sep. 28, 2017

Related U.S. Application Data

(63) Continuation-in-part of application No. 15/080,770, filed on Mar. 25, 2016.

(60) Provisional application No. 62/377,815, filed on Aug. 22, 2016.

(51) Int. Cl.
| | |
|---|---|
| *F23B 30/00* | (2006.01) |
| *F24B 1/182* | (2006.01) |
| *A47J 33/00* | (2006.01) |

(52) U.S. Cl.
CPC ............ *F23B 7/002* (2013.01); *A47J 33/00* (2013.01); *F24B 1/182* (2013.01)

(58) Field of Classification Search
CPC ............ A47J 33/00; F23B 7/002; F24B 1/182
See application file for complete search history.

(56) References Cited

U.S. PATENT DOCUMENTS

| | | | |
|---|---|---|---|
| 73,922 | A | 1/1868 | Philbrick |
| 585,001 | A | 6/1897 | MacDonald |
| 1,540,434 | A | 6/1925 | Stone |
| 2,590,903 | A | 4/1952 | Stretz |
| 2,720,269 | A | 10/1955 | Diacos |
| 2,933,378 | A | 4/1960 | Mustin et al. |
| 3,028,228 | A | 4/1962 | Chaplin |
| 3,105,483 | A | 10/1963 | Bryan |
| 3,279,900 | A | 10/1966 | Naples |

(Continued)

FOREIGN PATENT DOCUMENTS

| | | |
|---|---|---|
| CN | 201567838 | 9/2010 |
| CN | 102872559 A | 1/2013 |

(Continued)

OTHER PUBLICATIONS

Erfpunt; firewatch; erfpunt.be; downloaded on Aug. 29, 2017 from http://www.erfpunt.be/np/page.pphp?id=487&title=vuuklok.

(Continued)

*Primary Examiner* — Kenneth Rinehart
*Assistant Examiner* — Logan P Jones
(74) *Attorney, Agent, or Firm* — Knobbe Martens Olson & Bear LLP

(57) ABSTRACT

A vented fire tarp is provided that includes a base portion and a plurality of vents formed in the base portion, wherein each vent allows for air, smoke, and carbon dioxide to pass through the vent from one side of the base portion to the other. The vented fire tarp also includes securing devices to couple the base portion to a ground surface over a fire. In use, the vented fire tarp covers a fire and controls a burn rate of wood of the fire in response to controlling airflow through the plurality of vents of the vented fire tarp.

23 Claims, 11 Drawing Sheets

(56) References Cited

U.S. PATENT DOCUMENTS

| | | |
|---|---|---|
| 3,490,433 A | 1/1970 | Busenbarrick |
| 3,491,743 A | 1/1970 | Temp |
| 3,606,066 A | 9/1971 | Anderson |
| 3,782,475 A | 1/1974 | Schmidt |
| 3,841,298 A | 10/1974 | Sellors |
| 4,434,784 A | 3/1984 | Van Patten |
| 4,478,601 A | 10/1984 | Stephens |
| 4,508,094 A | 4/1985 | Hait |
| 4,635,612 A | 1/1987 | Kakubari et al. |
| 4,658,906 A | 4/1987 | Hanten |
| 4,719,935 A | 1/1988 | Gustafson |
| 4,751,911 A | 6/1988 | Betts et al. |
| 4,759,276 A | 7/1988 | Segroves |
| 4,829,975 A | 5/1989 | Hait |
| 4,832,703 A | 5/1989 | Campana et al. |
| 5,105,725 A | 4/1992 | Haglund |
| 5,253,634 A | 10/1993 | LeBeouf |
| 5,766,275 A | 6/1998 | Chandaria |
| 5,809,989 A | 9/1998 | Nelson |
| 5,984,406 A | 11/1999 | Lee |
| 6,074,446 A | 6/2000 | Fujino |
| 6,101,931 A | 8/2000 | Miklos |
| 6,131,560 A | 10/2000 | Healy |
| 6,173,644 B1 | 1/2001 | Krall |
| 6,254,265 B1 | 7/2001 | MacDonald |
| 6,349,713 B1 | 2/2002 | Toyama |
| 6,467,474 B2 | 10/2002 | Hermansen et al. |
| 6,918,387 B2 | 7/2005 | Klarich et al. |
| 6,962,148 B1 | 11/2005 | Ashbaugh |
| 6,997,111 B2 | 2/2006 | Geigerich |
| 7,445,004 B1 | 11/2008 | Milner et al. |
| 7,644,711 B2 | 1/2010 | Creel |
| 8,216,322 B2 | 7/2012 | Schweickhardt |
| 8,327,834 B1 | 12/2012 | Judge |
| 8,584,580 B2 | 11/2013 | Barrett |
| 10,151,490 B1 | 12/2018 | Wolf |
| 2003/0029443 A1 | 2/2003 | Davis et al. |
| 2003/0140577 A1 | 7/2003 | Cote |
| 2003/0145845 A1 | 8/2003 | Brocking |
| 2004/0262018 A1 | 12/2004 | Roussin |
| 2006/0076003 A1 | 4/2006 | Smolinsky et al. |
| 2006/0102169 A1 | 5/2006 | Smolinsky |
| 2006/0225725 A1 | 10/2006 | Rinaldo |
| 2009/0194297 A1 | 8/2009 | Teruel |
| 2011/0162634 A1 | 7/2011 | Richard |
| 2011/0209738 A1 | 9/2011 | McCarty |
| 2012/0125323 A1 | 5/2012 | Goeken |
| 2012/0152962 A1 | 6/2012 | Arbuckle |
| 2012/0318255 A1 | 12/2012 | Brown |
| 2013/0298895 A1 | 11/2013 | Robb |
| 2014/0069411 A1 | 3/2014 | Huang |
| 2014/0109896 A1 | 4/2014 | Codner |
| 2015/0004297 A1 | 1/2015 | Pothetes |
| 2016/0029566 A1 | 2/2016 | Gaudet |
| 2016/0033160 A1 | 2/2016 | Gaudet et al. |
| 2016/0338535 A1 | 11/2016 | Witsch |
| 2017/0081607 A1 | 3/2017 | Schunk |
| 2017/0276371 A1 | 9/2017 | Wolf |

FOREIGN PATENT DOCUMENTS

| | | | |
|---|---|---|---|
| DE | 20 2015 105 251 U1 | 11/2015 | |
| EP | 2933564 | 12/2016 | |
| GB | 299258 A | * 10/1928 | ............ E04H 15/26 |

OTHER PUBLICATIONS

The Historic Foodie; Couere-feu, The Practice of Preserving Fire; Nov. 2, 2011; thehistoricfoodie.wordpress.com ; https://thehistoricfoodie.wordpress.com/2011/11/02/couere-fue-the-practice-of-preserving-fire%C2%A9/.

Memory of the Netherlands; Fire bell; gehugenvannederland.nl; downloaded on Aug. 29, 2017 from http://www.geheugenvannederland.nl/nl/geheugen/view?coll=ngvn&identifier=ZZM01%3A011323.

Portable Outdoor Fire Pit : Collapsing Steel Mesh FirePlace—Perfect for Camping, Backyard and Garden—Carrying Bag Included; downloaded on Jan. 2, 2018 from https://www.amazon.com/Portable-Outdoor-Fire-Pit-Collapsing/dp/B01NBU7XLH/ref=sr_; in 4 pages.

Werkgroep Archelogie Hulst; Veiligheid in huis; archeologiehulst.nl; downloaded on Aug. 29, 2017 from http://www.archeologiehulst.np/pagina33.html.

Podpads.com, Bell Tent, available at http://podpads.com/bell-tent.

Fire Blanket Demonstration, "Fire Away Fire Blanket", available at https://youtu.be/8UEJOT4d-gA, dated Jan. 20, 2011.

LAPLANDER1, Frisport Andersnatten Extreme 6-8 Person Lavvu, Laplander's Natural Lore Blog, available at: https://naturallore.wordpress.com/2011/08/31/frisport-andersnatten-extreme-6-8-person-lavvu/, dated Aug. 31, 2011.

Objectlessons.com, Curfew, Fire Cover, Medieval, Replica webpage, available at: https://www.objectlessons.org/houses-and-homes-medieval/curfew-fire-cover-medieval-replica/s61/a245/.

Weber.com, Original Kettle Series, available at: https://www.weber.com/US/en/grills/original-kettle-charcoal-grill.

Welding-blankets.com, available at: http://www.welding-blankets.com, dated Dec. 1, 2009 per Wayback Machine.

Venetian Cat Studio; Medieval, Todor, Renaissance, Colonial; Feb. 28, 2016; venetiancat.com; http://venetiancat.com/CookwareAncientP2.html.

* cited by examiner

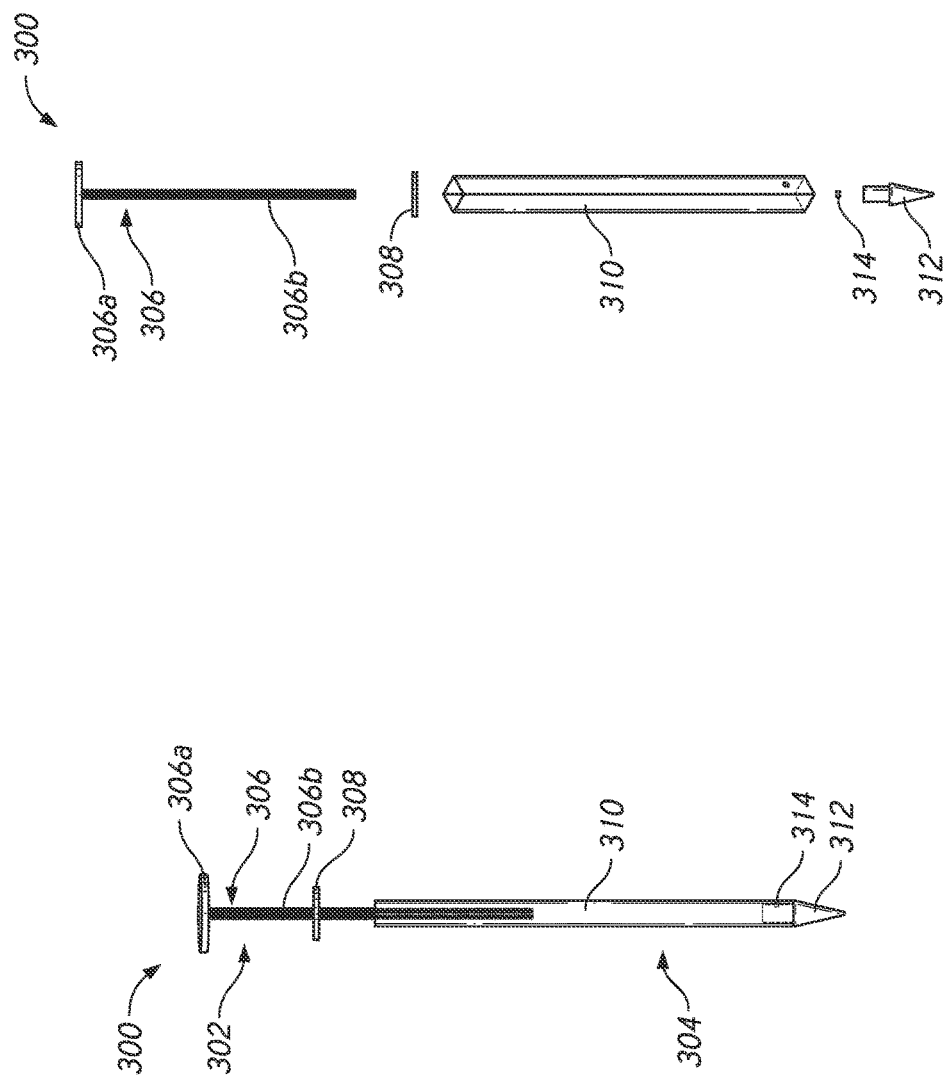

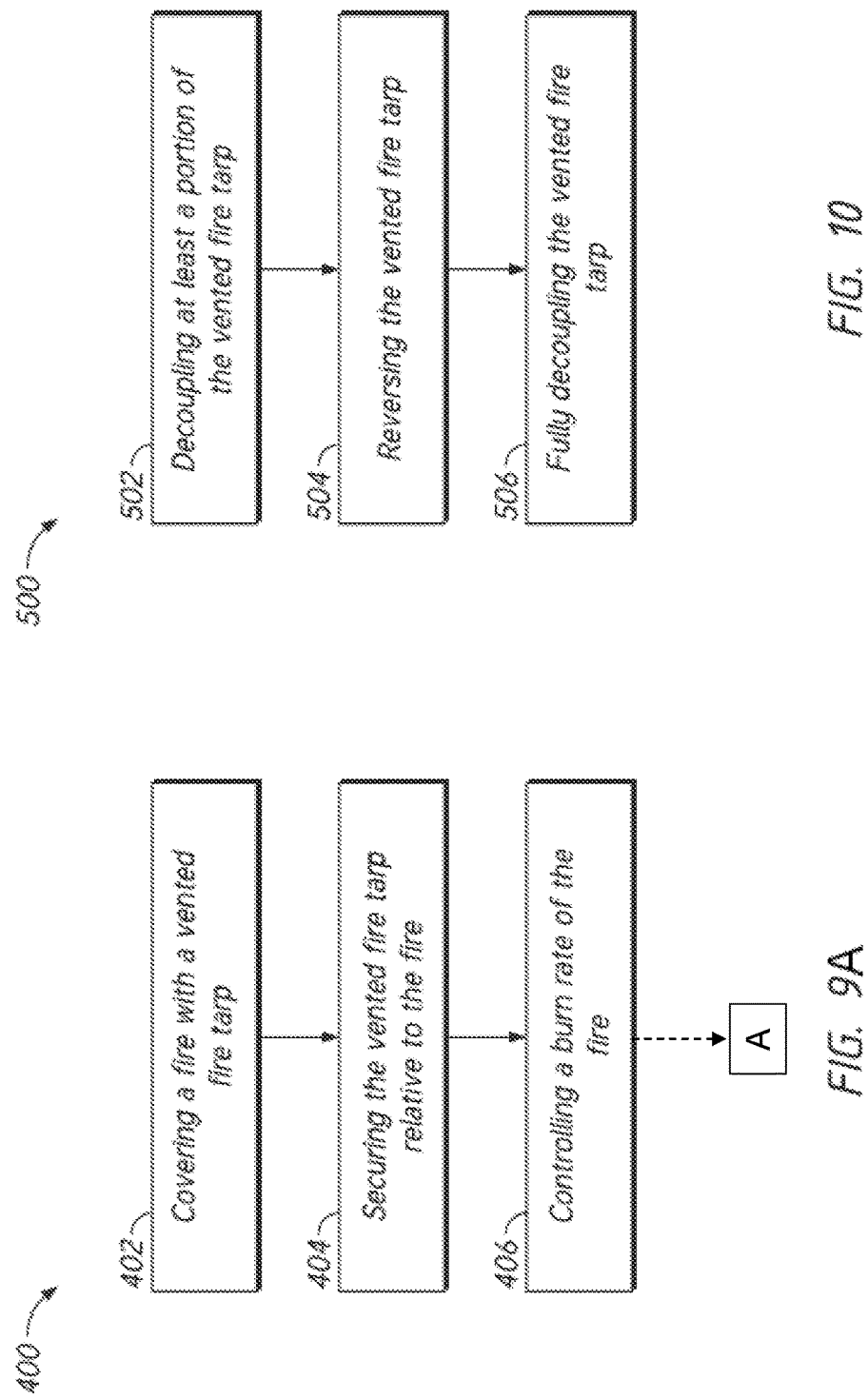

US 10,344,966 B2

VENTED FIRE TARP

CROSS-REFERENCE TO RELATED APPLICATIONS

This application is a continuation-in-part of U.S. application Ser. No. 15/080,770, filed Mar. 25, 2016, and also claims priority to U.S. Provisional Application No. 62/377,815, filed Aug. 22, 2016. The entireties of each of which are incorporated herein by reference.

BACKGROUND

Field

Certain embodiments described herein relate generally to fire equipment.

Background

In many cases, a fire region, such as a fire ring, exists as a designated spot to build and light a fire. Common methods of extinguishing a campfire involve the use of water or dirt or a combination of both. This makes it more difficult to start a new fire. Currently, there is no device that can be used to protect the campfire from spreading while still allowing the campfire or coals from the campfire to burn and remain hot. There is also no way to control the burn rate of the wood operating as fuel for the campfire. Because there is not such a device, a new campfire must always be started each time a camper has doused the flames and coal.

SUMMARY

Accordingly, there is a need for a fire tarp or cover that allows for controlling the burning rate of the fuel of a fire while preventing large embers from escaping the fire.

The embodiments described herein relate to vented fire tarps for use over a fire, such as a campfire within a campfire ring. The vented fire tarps can include vents that may be located over a fire, such as a campfire within a campfire ring, when securing the vented campfire tarp over the campfire and/or campfire ring. The vents can allow air, smoke, and carbon dioxide to pass through openings of the vent to control the burn rate of the fuel such as, but not limited to, wood used to make the fire.

In some embodiments, a vented fire tarp can include a base portion. A vented fire tarp can include a vent that can be formed in the base portion. The vent can allow for air, smoke, and carbon dioxide to pass through the vent from one side of the base portion to the other. The vented fire tarp can include one or more securing devices. The securing devices can couple the base portion to a ground surface when the vented fire tarp is placed over a fire.

In some embodiments, a vented fire tarp can include a base portion. The vented fire tarp can include a plurality of vents formed in the base portion. One or more of the vents can allow for air, smoke, and carbon dioxide to pass through the vent from one side of the base portion to the other. The vented fire tarp can include one or more securing devices. The one or more securing devices can couple the base portion to a ground surface when the vented fire tarp is placed over a fire.

In some embodiments, a method of using a vented fire tarp can include covering a fire with the vented fire tarp. One or more vents of the vented fire tarp can be located over the fire. The method can include coupling the vented fire tarp to a ground surface. The vented fire tarp can be coupled adjacent a fire ring to secure the vented fire tarp over the fire ring. The method can include controlling a burn rate of wood of the campfire in response to controlling airflow through the plurality of vents of the vented campfire tarp.

BRIEF DESCRIPTION OF THE DRAWINGS

These and other features, aspects and advantages are described below with reference to the drawings, which are intended to illustrate embodiments of fire tarps or covers, including embodiments of various components of fire tarps or covers or devices that may be used with such tarps or covers.

FIG. 8A is a schematic of an embodiment of a fire stake in an assembled configuration.

FIG. 8B is a schematic of the fire stake of FIG. 8A in a dissamebled configuration.

FIG. 9A is a flow chart of an embodiment of a method of applying a vented fire tarp to a fire.

FIG. 10 is a flow chart of an embodiment of a method of removing a vented fire tarp from a fire.

DETAILED DESCRIPTION

Figure 1:
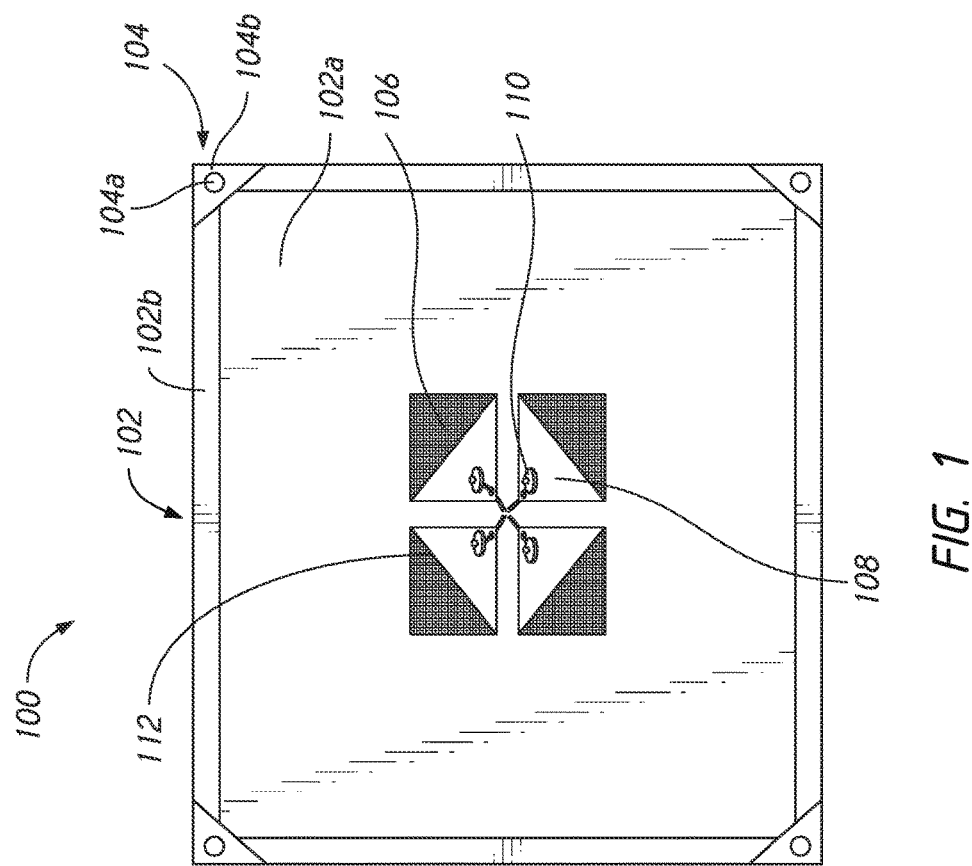
FIG. 1 is a top view of an embodiment of a vented fire tarp.

The present specification and drawings provide aspects and features of the disclosure in the context of several embodiments of fire tarps or covers including, but not limited to, vented fire tarps or covers which can be positioned over a fire, such as a campfire. Accordingly, the embodiments described herein may be discussed in connection with specific fires and specific situations, such as a campfire having a campfire ring while at a campsite. However, it is to be understood that the features and concepts discussed herein can be applied to other types of fires and situations, such as fires in cooking stoves and/or heating furnaces for use in a domicile. In addition, particular features of a fire tarp or cover should not be taken as limiting. For example, although the embodiments described herein include one or more vents to allow passage of gases and/or particulates, such as air, smoke, and carbon dioxide, through the one or more vents to control the burn rate of the fuel of the campfire, it is to be understood that the one or more vents can be omitted. Moreover, features of any one embodiment discussed herein can be used separately or combined with one or more features of any other embodiments.

Certain terminology may be used in the following description for the purpose of reference only, and thus are not intended to be limiting. For example, terms such as "upper", "lower", "upward", "downward", "above", "below", "top", "bottom" and similar terms refer to directions in the drawings to which reference is made. Terms such as "outward", "inward", "outer", "inner", and "side", describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import. Similarly, the terms "first", "second", and other such numerical terms referring to structures neither imply a sequence or order unless clearly indicated by the context.

Figure 2A:
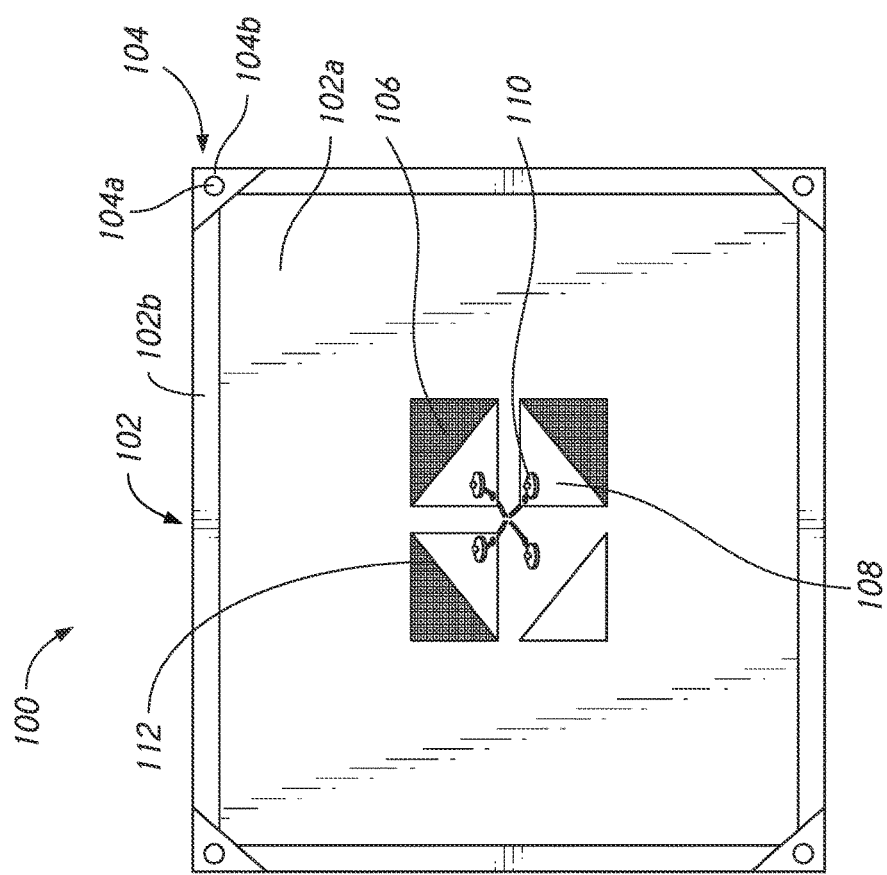
FIG. 2A is a top view of the vented fire tarp of FIG. 1 with a flap in a closed position.
Figure 2B:
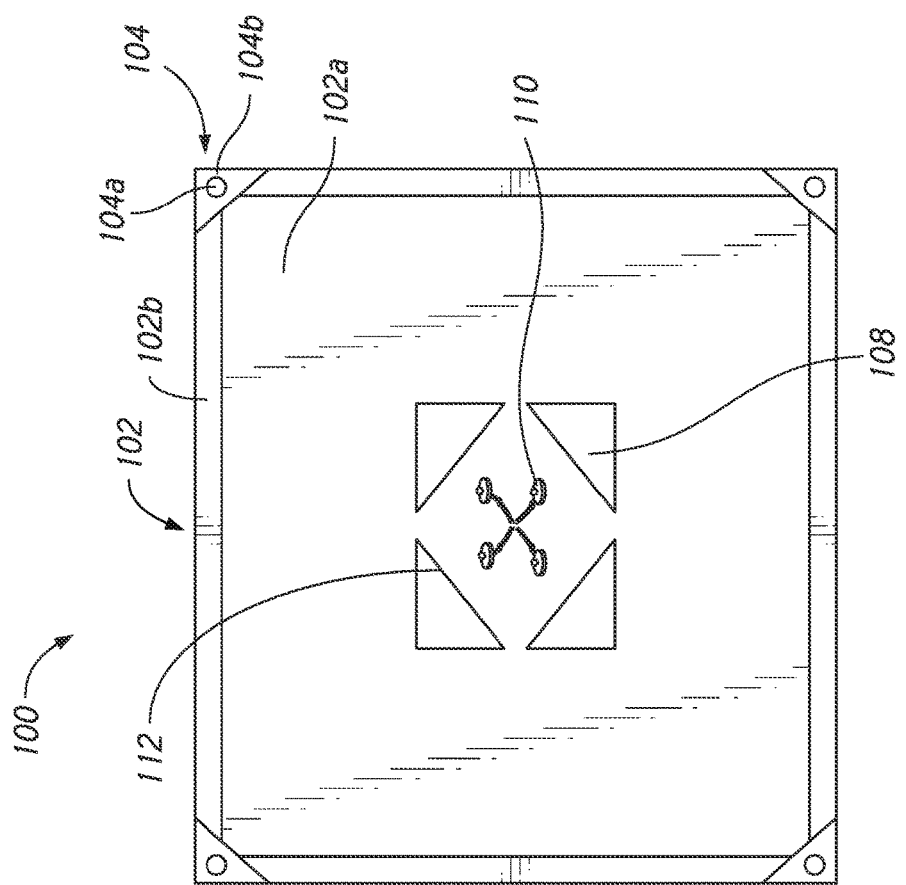
FIG. 2B is a top view of the vented fire tarp of FIG. 1 with all flaps in a closed position.
Figure 3:
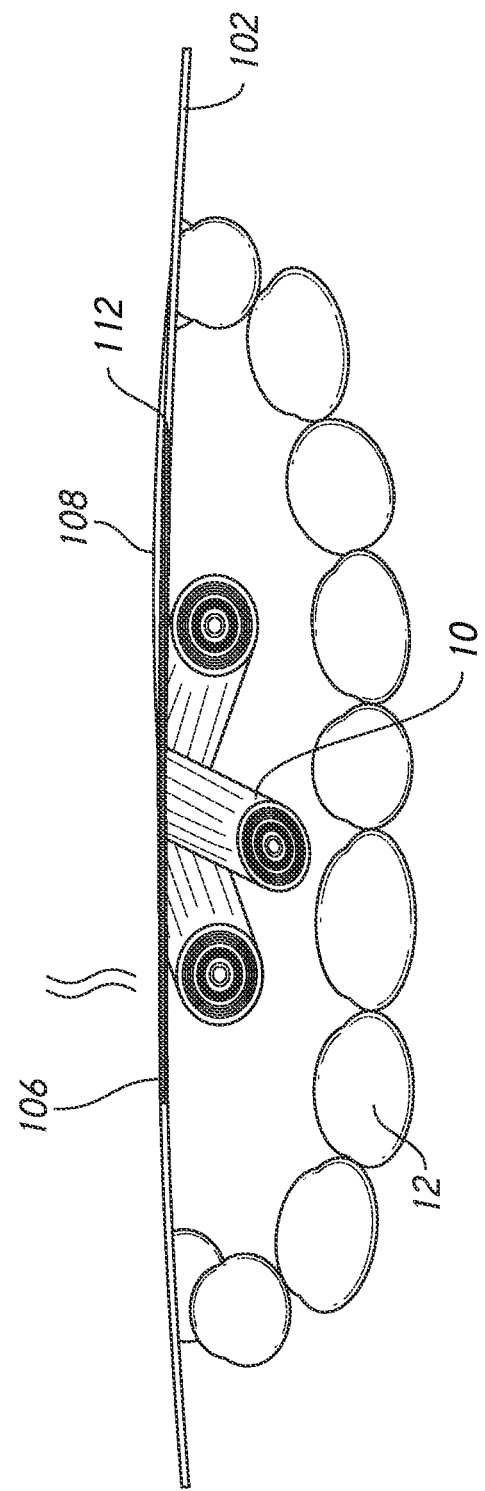
FIG. 3 is a section view of the vented fire tarp of FIG. 1 over a fire ring.

FIGS. 1-3 illustrate a vented fire tarp or cover 100. With reference first to FIG. 1, the vented fire tarp 100 can include a base portion 102, one or more securing devices 104, one or more vents 106, and/or one or more flaps 108. The base portion 102 can include a body section 102a and/or one or more side or edge sections 102b. As shown in the illustrated embodiment, the body section 102a can form a majority of the base portion 102. The side sections 102b can form a periphery of the base portion 102.

The body section 102a can be designed to be positioned over a fire 10, such as a wood-fueled fire within a fire ring 12. At least a portion of the body section 102a can be formed from materials which are generally heat resistant, insulating, and/or water-resistant or waterproof. In the illustrated embodiment, the bottom side of the body section 102a is intended to be positioned directly over a fire, such as is shown in FIG. 3, and the top side of the body section 201a faces in the opposite direction from the bottom side and is intended to be positioned above the fire but facing away from the fire.

The bottom side and the top side of the body section 102a can be formed from a generally heat or thermally resistant material. For example, either or both of the bottom side and the top can be made of material(s) and/or formed in such a way that they will not melt or burn or emit appreciable amounts of vapor or smoke (especially harmful types of vapor or smoke) when exposed to temperatures within the range normally encountered in a standard fire used for human warmth and/or cooking, such as a wood-burning fire. In some embodiments, the body section 102a is a composite made of two or more materials. Since the bottom side will generally encounter much higher temperatures than the top side, the bottom side can have a higher heat resistivity than the top side. For example, in some embodiments, the bottom side can be made of material(s) and/or formed in such a way that its heat resistivity is sufficient to not melt or burn or emit appreciable amounts of vapor or smoke when exposed to temperatures within the range normally encountered in a standard fire used for human warmth and/or cooking, while the top side can be made of different material(s) and/or formed in such a way that its heat resistivity is lower than the heat resistivity of the bottom side, but still sufficiently high so as not to melt or burn or emit appreciable amounts of vapor or smoke when exposed to the heat transmitted from the lower face of the bottom side to the upper face of the bottom side (where the top side and the bottom side interface) when the bottom side is exposed to such a fire.

In some embodiments, both the bottom and top sides can be made of material(s) and/or formed in such a way that heat conductivity is low. For example, in the bottom side and/or the top side, when a particular region of the body section 102a encounters a high temperature, it can resist transferring such high temperature laterally to adjacent portions of the body section 102a and/or it can resist transferring such high temperature from a bottom face to a top face. For example, in some embodiments, the temperature of a lateral region or a top face adjacent to a fire can be less than or equal to about three-quarters or less than or equal to about one-half of the temperature of a region of the body section 102a that is closer to or closest to a fire (e.g., adjacent to the lateral region or on the bottom face).

In some embodiments, the body section 102a can be made of material(s) and/or formed in such a way that the heat resistivity and/or the thermal conductivity of the body section 102a produce(s) a temperature range on the top face of the top side that is sufficiently low to permit a user to touch, without incurring significant discomfort and/or burn injury: (a) the upper face of the top side immediately laterally surrounding the region of the body section 102a where, on the lower face of the bottom side, the fire is in contact with or directly below the body section 102a; and/or (b) a majority, or substantially all, or all of the upper face of the top side when the bottom side is exposed to fire.

In some embodiments, the bottom side of the body section 102a can be formed from one or more materials that include, or have one or more of the same or similar properties as, amorphous silica fabric and/or ceramic fabric. The top side of the body section 102a can be formed from a generally water-resistant or waterproof material and/or a generally insulating material. The body section 102a can be configured to inhibit or resist or prevent the transfer or liquid and/or gas (e.g., water, air, and/or smoke) from the bottom side to the top side of the body section 102a. In some embodiments, the top side of the body section 102a can be formed from one or more materials that include, or have one or more of the same or similar properties as, silicone, such as a silicone resin coating. A layer of this type can advantageously prevent or inhibit water seepage through the body section 102a which could otherwise potentially quench an underlying fire (such as during rain). In some embodiments, the main body section 102a and/or other sections of the base portion 102 can be formed from an amorphous silica fabric with silicone resin impregnated therein on at least the top side of the body section 102a or in some cases only on the top side of the body section 102a. The silicone resin can be impregnated into the amorphous silica fabric via heat and/or cross-linking and/or pressure. For example, the silicone resin can be impregnated into the amorphous silica fabric via heat treatment and/or pressurized rollers.

The side sections 102b can be designed to be positioned away from the fire. For example, the side sections 102b can be positioned at or proximate a ground surface when the vented fire tarp 100 is positioned over a fire. In some instances, the side sections 102b can be designed to be held by a user when positioning the vented fire tarp 100 over the fire and/or removing the vented fire tarp 100 from the fire. At least a portion of the side sections 102b can be formed from one or more materials which are generally thermally insulating and/or have very low thermal conductivity. In this manner, the side sections 102a can remain at or around ambient temperature even after the vented fire tarp 100 has been positioned over the fire for an extended period of time. This can be advantageous as it can allow for positioning and/or removal of the vented fire tarp 100 with a user's bare hands. In some embodiments, the side sections 102b can be formed from materials used in any of the other sections, or other types of materials. In some embodiments, the thickness of one or more of the side sections 102b is greater than the thickness of the fire tarp 100 in the central region.

In some embodiments, the side sections 102b can be formed of a material similar to that of the body section 102a. For example, in some embodiments, the body section 102a can be formed from a material that sufficiently insulates heat such that portions of the body section 102a not positioned directly over the fire remain at or around a temperature, such as ambient temperature, comfortable to grasp with bare hands. In some embodiments, handles (not shown) can be attached to the body section 102a and/or side sections 102b which can be formed to allow a user to position and/or remove the vented fire tarp 100. The handles can be formed from an insulated material.

With continued reference to the vented fire tarp 100 illustrated in FIG. 1, the securing devices 104 can be used to couple the base portion 102 to a ground surface when the vented fire tarp 100 is placed over a fire, such as a fire within a fire ring. As shown in the illustrated embodiment, the securing devices 104 can comprise apertures 104a in the base portion 102. One or more fasteners such as, but not limited to, stakes or spikes, can be inserted through one or more of the apertures to secure the base portion 102 into the ground surface. The securing devices 104 can include a reinforcement structure 104a to strengthen the portions surrounding the apertures 104a, such as one or more eyelets.

In some embodiments, the securing devices 104 can comprise loops (not shown) attached to or in the base portion 102. One or more fasteners can be inserted through one or more of the loops to secure the base portion 102 into the ground surface. While apertures 104a and loops have been described as securing devices 104 or portions thereof, it is to be understood that any type of securing device 104 may be utilized to secure the vented fire tarp 100 to a ground surface over a fire. For example, one or more of the securing devices 104 can include fasteners such as, but not limited to, the aforementioned stakes or spikes. Moreover, although the illustrated embodiment includes securing devices 104 on corners of the base portion 102, it is to be understood that the securing devices 104 can be positioned along other portions of the base portion 102. For example, in some embodiments, the securing devices 104 can be positioned along the middle of the side sections 102b. In some embodiments or methods of use, one or more regions (such as one or more side sections or edges or peripheral regions) can be more dense or heavier or thicker or otherwise weighted greater than one or more other regions (such as a central region) of the fire tarp 100 to provide more inertia to help retain the tarp 100 in position over the fire and to keep the perimeter of the tarp 100 close to, or in contact with, or on, the ground to avoid permitting air to move in or smoke to move out under an open edge region of the tarp 100. In some embodiments, one or more items, such as one or more elongate bars or weights or rocks or any other suitable weighty item can be positioned on top of the fire tarp 100 along one or more edges to help keep the perimeter of the tarp 100 close to, or in contact with, or on, the ground, especially in situations where the ground is rocky or otherwise difficult to penetrate with a securing stake.

With continued reference to the vented fire tarp 100 illustrated in FIG. 1, the vents 106 can be coupled to the base portion 102. The vents 106 can allow gases and/or particulates, such as air, smoke, and carbon dioxide, to pass through the vents 106 from one side of the base portion 102, such as a bottom side of the base portion 102, to the other side of the base portion 102, such as a top side of the base portion 102. In some embodiments, one or more of the vents 106 can include a mesh. The mesh can include openings sized to prevent or inhibit embers that are at least as large as about ⅛ inch in cross-section or at least as large as about ¼ inch in cross-section to pass through the vent 106, such as sparks or embers that are capable of floating in the air. Although the illustrated embodiment includes multiple securing devices 104, multiple vents 106, and multiple flaps 108, it is to be understood that in some embodiments the vented fire tarp 100 can include fewer securing devices 104, vents 106, and/or flaps 108. For example, in some embodiments, the vented fire tarp 100 can include a single vent 106 and/or a single flap 108.

The flaps 108 can be coupled to the base portion 102. In some embodiments, each flap 108 can correspond to a vent 106. In some embodiments, each flap 108 can be moveable between an open position and a closed position. The open position can expose the vent 106. This can allow air, smoke, and carbon dioxide to pass through the vent 106. The closed position can cover the vent 106. This can prevent or inhibit air from passing through the vent 106. In some embodiments, the flaps 108 can be moved to any position between a fully open position and a fully closed position such that the vent 106 can be in a partially open state. This can beneficially allow a greater degree of control over the amount of air, smoke and carbon dioxide allowed to pass through the vent 106. This can advantageously allow for the burn rate of the fire to be more precisely controlled.

The vented fire tarp 100 can include one or more flap fasteners 110. The flap fasteners 110 can releasably couple the flap 108 to the base portion 102 to retain the flap 108 in position relative to the base portion. For example, the flap fasteners 110 can maintain the flaps 108 in a fully open position, a partially open position, and/or a closed position. The flap 108 can be coupled to the base portion 102 with a hinge 112. In some embodiments, hinge 112 can be a seam and the flap 108 can be pivotable or foldable about the seam. As shown in FIGS. 2A-2B, one or more of the hinges 112 can be located along an edge of the corresponding vent 106. The vent 106 can be triangular in shape and the corresponding flap 108 can also be triangular in shape. However, it is to be understood that the flap 108 and the vent 106 can have different shapes. In operation, the hinge 112 can allow the flap 108 to rotate with respect to the base portion 102 in a first direction to move the flap 108 into the closed position and to rotate the flap 108 with respect to the base portion 102 in a second direction to move the flap 108 into the open position.

The vent area can be adjusted to control the burn rate of the fire. In some embodiments, the vent area can be controlled by adjusting the total number of open vents or the total amount of area through which gas is permitted to be transferred from one side of the tarp to another side of the tarp. As shown in FIG. 2A, one flap 108 is in the closed position such that a single vent 106 is covered and the remaining vents 108 remain in the open position. As shown in FIG. 2B, all flaps 108 are in the closed position such that all vents 106 are covered. As compared to FIG. 2A, the configuration illustrated in FIG. 2B prevents or inhibits a greater degree of airflow through the vented fire tarp 100. This can reduce the burn rate of the fire. Depending on the desired burn rate, one, some or all vents can be covered or all vents can remain uncovered. In some embodiments, the vent area can be adjusted by positioning the flap 108 between a fully open and a fully closed position such that the vent 106 is in a partially open state. When used in combination with multiple vents, this can advantageously allow for a significant degree of control over vent area and burn rate of the fire.

FIGS. 4-7 depict a vented fire tarp or cover 200 or components thereof. The vented fire tarp or cover 200 can include any one or more of the same, or similar, structures and features as those of vented fire tarp or cover 100 described in connection with FIGS. 1-3. Accordingly, it is to be understood that any structures and features of vented fire tarp or cover 100 can be applied to vented fire tarp or cover 200 or the converse.

Figure 4:
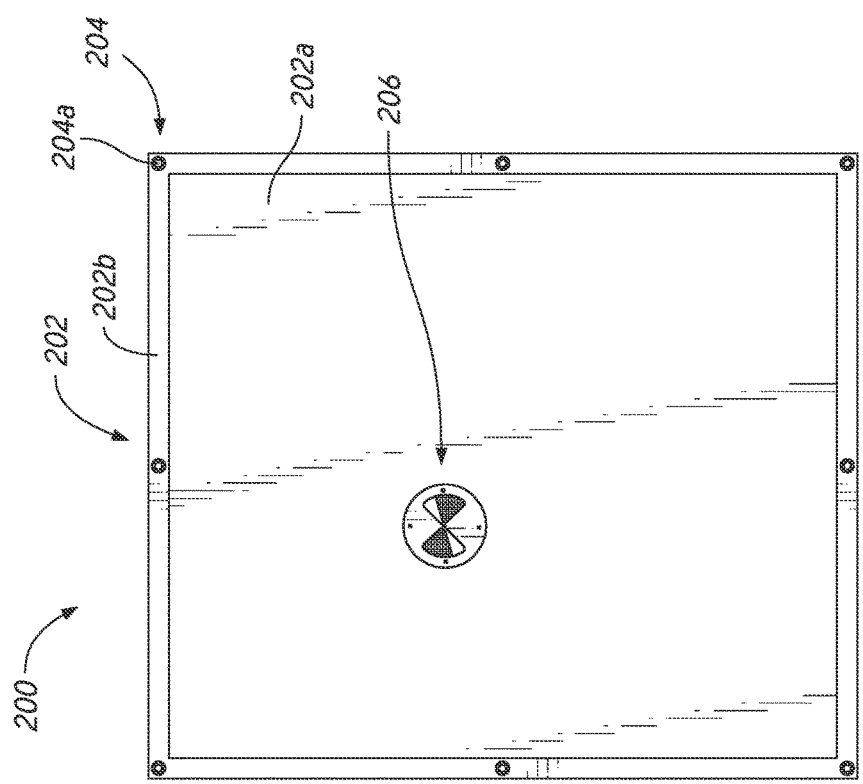
FIG. 4 is a top view of another embodiment of a vented fire tarp.

With reference first to FIG. 4, the vented fire tarp 200 can include a base portion 202, one or more securing devices 204, and/or one or more vents. In some embodiments, the vent 206 can be a single-movement adjustable vent, such as a pinwheel vent 206, which does not require multiple movements on multiple regions or sections of the vent to change the venting properties within a range of adjustment desirable for a fire tarp. Many other types of selectively adjustable vents (which may be single-movement adjustable vents in some embodiments) can be used, including a slider vent, and/or a rotating flap vent (with one or more flaps), and/or a flue vent, and/or a louver vent, and/or an electronic heat-responsive vent that automatically opens as needed under an elevated temperature using an electronic sensor (such as a thermocouple) and a solenoid or a servo or a motor, and/or an automatic valve with a mechanical thermostat, etc. Any reference to a vent anywhere in this application can apply to any type of vent disclosed in this specification or otherwise suitable for use herein. The base portion 202 can include a body section 202a and/or one or more side or edge sections 202b. As shown in the illustrated embodiment, the body section 202a can form a majority of the base portion 202. The side sections 202b can form a periphery of the base portion 202.

Figure 6:
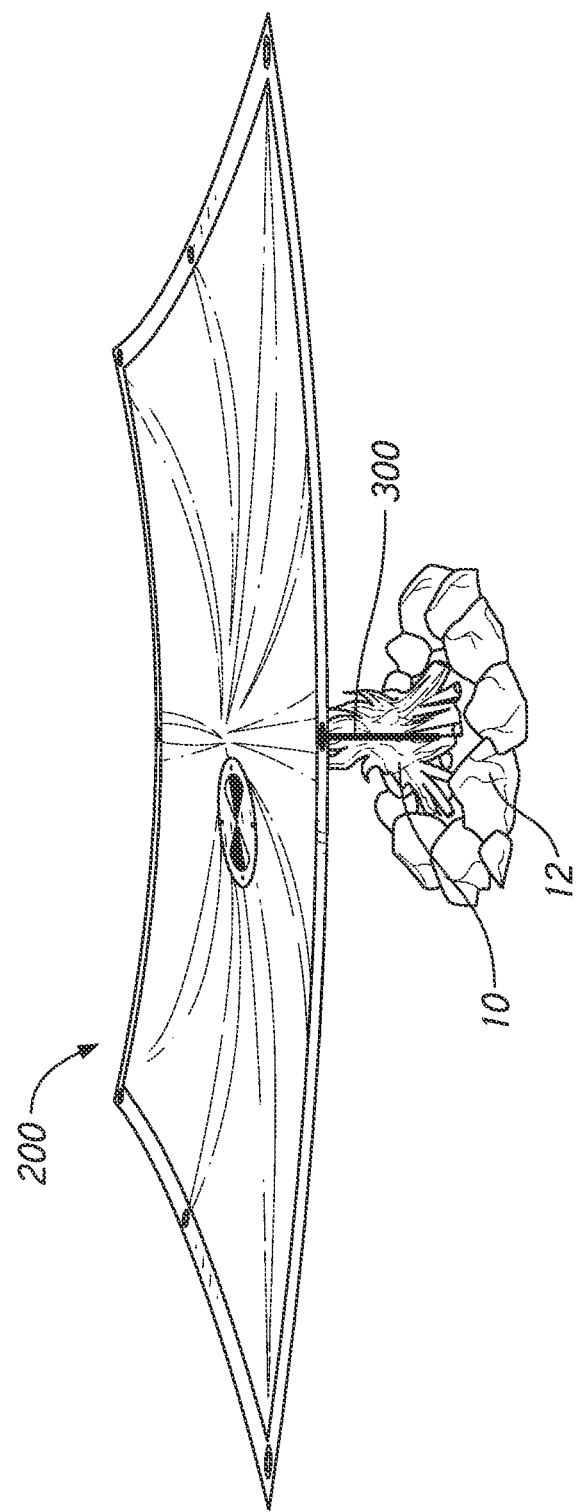
FIG. 6 is a perspective view of the vented fire tarp of FIG. 4 positioned over a fire ring and a fire stake.
Figure 7:
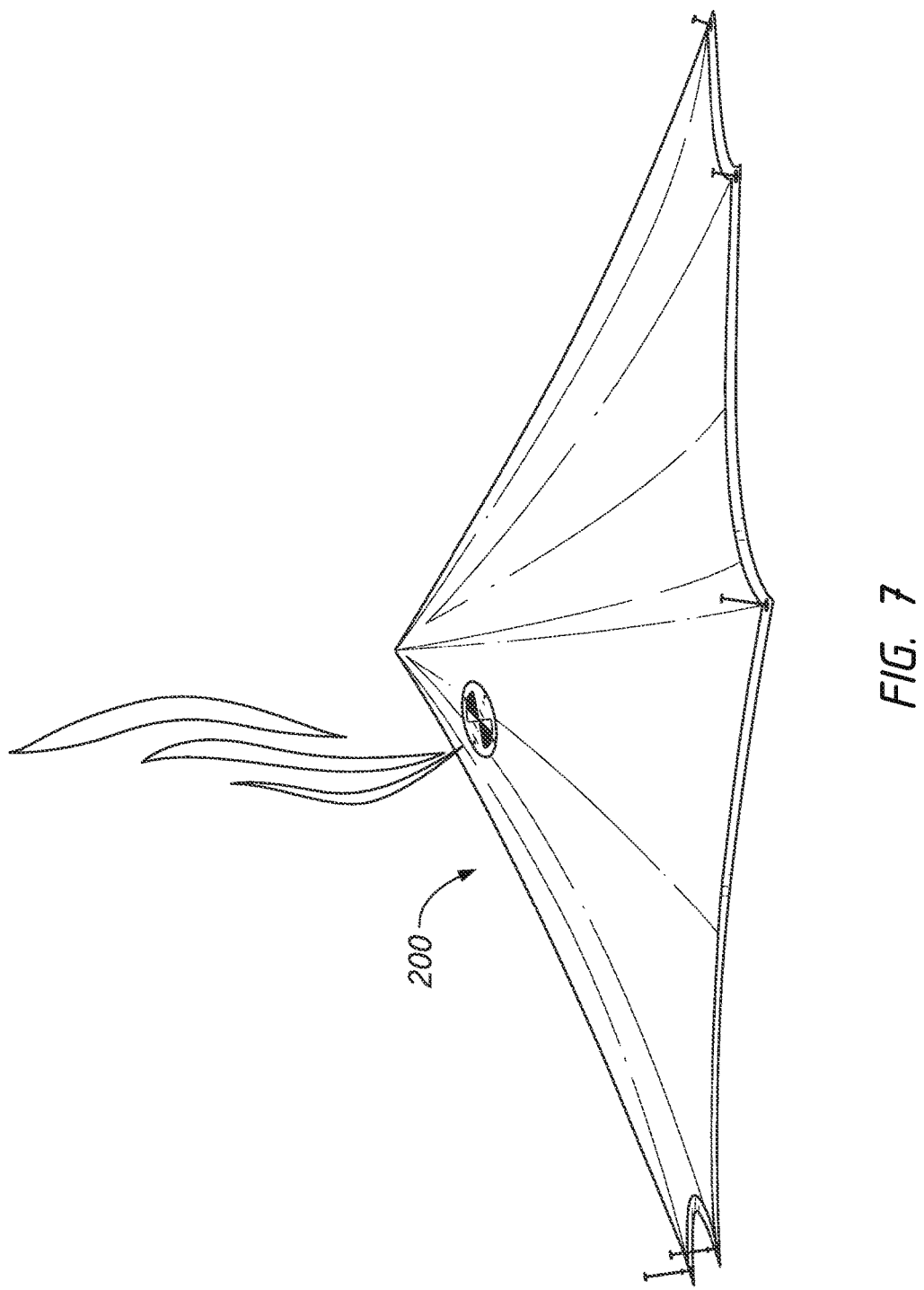
FIG. 7 is a perspective view of the vented fire tarp of FIG. 4 over a fire ring with a fire stake and secured to a ground surface.

The body section 202a can be designed to be positioned over a fire 10, such as a wood-fueled fire within a fire ring 12. The body section 202a can include any feature, structure, material, method, and/or step described and/or illustrated in connection with the body section 102a (and vice versa). At least a portion of the body section 202a can be formed from materials which are generally heat resistant, insulating, and/or water-resistant or waterproof. For example, in instances where the bottom side of the body section 202a is intended to be positioned directly over a fire, such as is shown in FIGS. 6-7, the bottom side can be formed from a generally heat resistant material. In some embodiments, the bottom side of the body section 202a can be formed from materials such as amorphous silica fabric and/or ceramic fabric. The top side of the body section 202a can be formed from a generally water-resistant or waterproof material and/or a generally insulating material. In some embodiments, the top side of the body section 202a can include a silicone resin coating. This can advantageously prevent or inhibit water seepage through the body section 202a which can potentially quench an underlying fire. In some embodiments, the main body section 202a and/or other sections of the base portion 202 can be formed from an amorphous silica fabric with silicone resin impregnated therein. The silicone resin can be impregnated into the amorphous silica fabric via heat and/or pressure. For example, the silicone resin can be impregnated into the amorphous silica fabric via heat treatment and/or pressurized rollers.

The side sections 202b can be designed to be positioned away from the fire. For example, the side sections 202b can be positioned at or proximate a ground surface when the vented fire tarp 200 is positioned over a fire. In some instances, the side sections 202b can be designed to be held by a user when positioning the vented fire tarp 200 over the fire and/or removing the vented fire tarp 200 from the fire.

At least a portion of the side sections 202b can be formed from materials which is generally insulating. In this manner, the side sections 202a can remain at or around ambient temperature even after the vented fire tarp 200 has been positioned over the fire for a period of time. This can be advantageous as it can allow for positioning and/or removal of the vented fire tarp 200 with a user's bare hands. In some embodiments, the side sections 202b can be formed from any low thermal conductivity and/or thermally resistant materials such as any of those materials that are disclosed or whose properties are described elsewhere in this specification.

In some embodiments, the side sections 202b can be formed of a material similar to that of the body section 202a. For example, in some embodiments, the body section 202a can be formed from a material that sufficiently insulates heat such that portions of the body section 202a not positioned directly over the fire remain at or around a temperature, such as ambient temperature, comfortable to grasp with bare hands. In some embodiments, handles (not shown) can be attached to the body section 202a and/or side sections 202b which can be formed to allow a user to position and/or remove the vented fire tarp 200. The handles can be formed from an insulated material.

With continued reference to the vented fire tarp 200 illustrated in FIG. 4, the securing devices 204 can be used to couple the base portion 202 to a ground surface when the vented fire tarp 200 is placed over a fire, such as a fire within a campfire ring. As shown in the illustrated embodiment, the securing devices 204 can be apertures 204a in the base portion 202. The securing devices 204 can be positioned at corners of the base portion 202 and/or along portions of the side sections 202b between the corners. For example, the vented fire tarp 200 can include four securing devices 204 at the four corners of the base portion 202 and four securing devices 204 along the middle of the side sections 202b. This can advantageously allow for enhanced securement of the vented fire tarp 200 around the periphery of the fire 10. However, it is to be understood that fewer or greater numbers of securing devices 204 can be used. For example, securing devices 204 can be omitted along the middle portion of the side sections 202a similar to that illustrated in FIGS. 1-3. One or more fasteners such as, but not limited to, stakes or spikes, can be inserted through one or more of the apertures to secure the base portion 202 into the ground surface. The securing devices 204 can include a reinforcement structure (not shown) to strengthen the portions surrounding the apertures 204a.

In some embodiments, the securing devices 204 can be loops (not shown) attached to or in the base portion 202 or other types of securing devices. For example, one or more of the securing devices 204 can include fasteners such as, but not limited to, one or more of the aforementioned stakes or spikes or weights or any other method or structure for securing the base portion 202, as disclosed in this specification or otherwise.

Figure 5B:
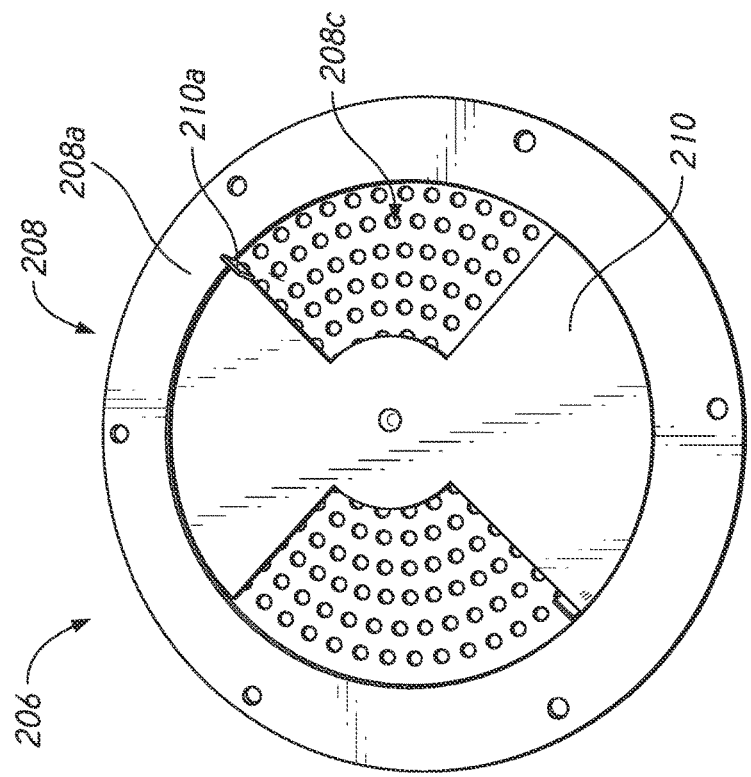
FIG. 5B is a top view of the pinwheel vent of FIG. 5A in an open position.
Figure 5A:
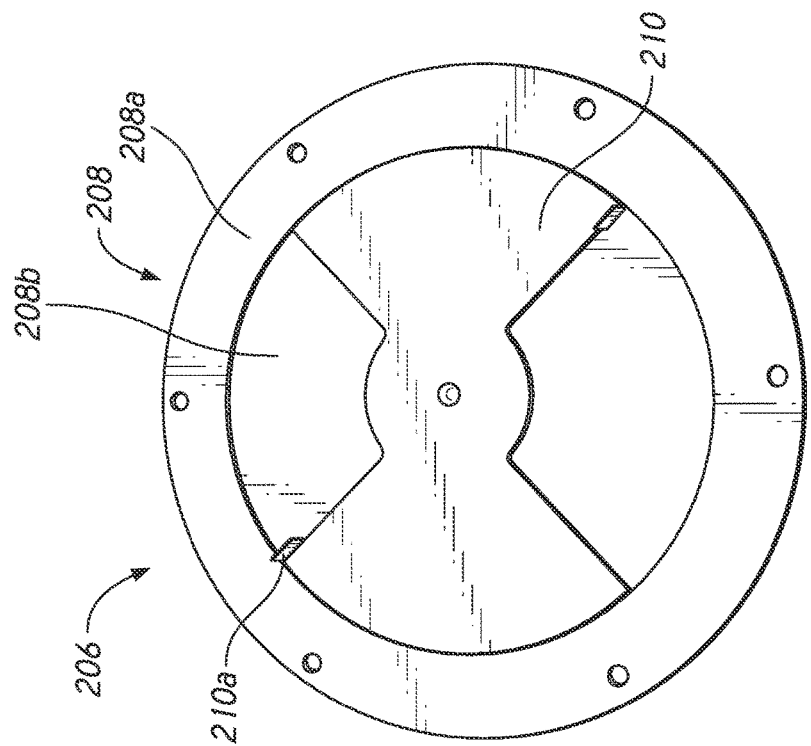
FIG. 5A is top view of the pinwheel vent of the vented fire tarp of FIG. 4 in a closed position.

With reference next to the adjustable vent, such as the pinwheel vent 206 illustrated in FIGS. 5A-5B or any other suitable vent, the vent can be coupled to the base portion 202. In the illustrated embodiment, the pinwheel vent 206 can allow gases and/or particulates, such as air, smoke, and carbon dioxide, to pass through the vent 206 from one side of the base portion 202, such as a bottom side of the base portion 202, to the other side of the base portion 202, such as a top side of the base portion 202. Any other type of vent can be used to accomplish any one or any combination of the features disclosed herein. As shown in the illustrated embodiment, the pinwheel vent 206 can include a vent member 208 and an adjustment member 210. The vent member 208 can include a peripheral section 208a, an unvented section 208b, and/or a vented section 208c. The peripheral section 208a can be structurally reinforced and can be fastened to the base portion 202. The unvented section 208b can be a recessed section on which the adjustment member 210 can move. As shown in the illustrated embodiment, the unvented section 208b can have no openings or can otherwise impede or resist the passage of gas and/or liquid from one side of the vent 206 to the other side of the vent 206. The vented section 208c can be a recessed section on which the adjustment member 210 can move. As shown in the illustrated embodiment, the vented section 208c can include openings sized to prevent or inhibit embers larger than about ¼ inch in size to pass through the vented section 208c. As shown in the illustrated embodiment, the vented section 208c includes openings of similar size. However, it is to be understood that the vented section 208c can include openings of variable size. For example, the openings along certain radial sections can be smaller than openings along other radial sections. In some embodiments, the size of the openings can increase as the pinwheel vent 206 is opened. Moreover, although pinwheel vent 206 has been described as including an unvented section 208b in some embodiments, it is to be understood that the unvented section 208b can be omitted, as with any other feature disclosed in this specification.

The adjustment portion 210 can be coupled to the vent member 208. In some embodiments, the adjustment member 210 can be rotated or otherwise moved between an open position and a closed position. As shown in FIG. 5B, the open position can expose the vented portion 208c. This can allow air, smoke, and carbon dioxide to pass through the vented section 208c. As shown in FIG. 5A, the closed position can cover the vented section 208c. This can prevent or inhibit air from passing through the vented section 208c.

In some embodiments, the adjustment member 210 can be moved to any position between a fully open position and a fully closed position such that the pinwheel vent 206 (or any other type of vent) can be in a partially open state. This can beneficially allow a greater degree of control over the amount of air, smoke and carbon dioxide allowed to pass through the vented section 208c. This can advantageously allow for the burn rate of the fire to be more precisely controlled by allowing a user to adjust the vent area by adjusting the exposed area of the vented section 208c. Although the adjustment member 210 has been described as being rotatable, it is to be understood that the adjustment member 210 can be generally movable relative to the vent member 208. For example, in some embodiments, the adjustment member 210 can be translatable relative to the vent member 208.

As shown in the illustrated embodiment, the adjustment member 210 can include one or more handles or protrusions 210a. The handles or protrusions 210a can facilitate rotation and/or translation of the adjustment member 210 by user. In some embodiments, the handles or protrusions 210a can include an insulated coating, such as silicone, to maintain the handles or protrusions 210a at a lower temperature. For example, in some embodiments, the insulated coating can maintain the handles or protrusions 210a at or slightly above ambient temperature. However, it is to be understood that such an insulated coating can be omitted.

Although the illustrated embodiment includes a single pinwheel vent 206, it is to be understood that in some embodiments the vented fire tarp 200 can include two or more pinwheel vents 206 or vents of various types, such as the flap-based vent 106, 108 described above in connection with vented fire tarp 100. Moreover, it is to be understood that other types of vents and valves can be used in connection with the vented fire tarp 200, including any one or more of the other vents disclosed in this specification.

With reference next to FIGS. 8A-8B, an embodiment of an elevation member, such as a fire stake 300, is illustrated to help elevate at least a portion of the fire tarp above the bottom region and/or top region of a fire. Each reference to a fire stake 300 in this specification can be applied to any other type of elevation member, such as a block or ring or cage, etc. In some embodiments (not shown), an elevation member comprises a biased or permanently elevated bump or rise in the body of the fire tarp itself, such as when a reinforcing member is included within or attached to or integral with the fire tarp. The fire stake 300 can be used with fire tarps, such as vented fire tarps 100, 200. The fire stake 300 can be inserted into a fire 10, before or after the fire has been started, to provide a structure having an increased height. See, for example, FIGS. 6-7 which illustrate vented fire tarp 200 and fire stake 300. This structure can beneficially create a pitched area underneath the fire tarp, as with any other elevation member. This can advantageously increase air entrainment beneath the fire tarp. Moreover, this can advantageously reduce the likelihood that the fire tarp contacts the fuel source. This can be particularly beneficial in situations where no fire ring, or only a low fire ring, exists around the underlying fire.

The fire stake can include an upper member 302 and a lower member 304. As shown in the illustrated embodiment, the upper member 302 can be received within the lower member 304. The upper member 302 can include a mounting body 306, such as a screw, and a platform 308. The mounting body 306 can have a head portion 306a and a threaded portion 306b. The head portion 306a can have a larger cross-sectional dimension, measured along a plane orthogonal to a longitudinal axis of the mounting body 306, as compared to the threaded portion 306b. The platform 308 can be adjusted relative to the mounting body 306 by rotating the platform 308 relative to the threaded portion 306b of the mounting body 306. In this manner, the platform 308 can have a wide range of adjustability. However, it is to be understood that other types of adjustable members can be used. For example, rather than a threaded mounting body 306 and correspondingly threaded platform 308, the upper member 302 can include a base and a platform which is attached to the base via a screw, pin, detents, or the like. In some embodiments, the elevation member can comprise an adjustable spring-button spike, a multi-piece stackable securing member, or the like.

The lower member 304 can include a housing 310 and a tip 312. The housing 310 can be generally hollow such that the screw 306 can be inserted therein. The tip 312 can be attached to the housing 310 using a mechanical fastener, such as a pin 314. However, it is to be understood that other types of mechanical fasteners such as, but not limited to, screws and bolts, chemical fasteners such as, but not limited to, adhesives, fastening techniques such as, but not limited to, sintering and welding, and/or a combination of such fasteners and techniques can be used. In some embodiments, the tip 312 can be monolithically formed with the housing 310. As shown in the illustrated embodiment, the tip 312 can be pointed to facilitate insertion of the tip 312, and the fire stake 300, into a ground surface.

The platform 308 can sit on a top end of the housing 310. As such, to adjust the height or length of the fire stake 300, the platform 308 can be moved relative to head portion 306a. Increasing the distance between the platform 308 and the head portion 306a can increase the overall height or length of the fire stake 300. In some embodiments, the platform 308 can be omitted and a threaded portion can be positioned within the housing 310. In such an embodiment, the mounting body 306 can be directly coupled to the housing 310 and adjusted by moving the head portion 306a relative to the housing 310.

Figure 9B:
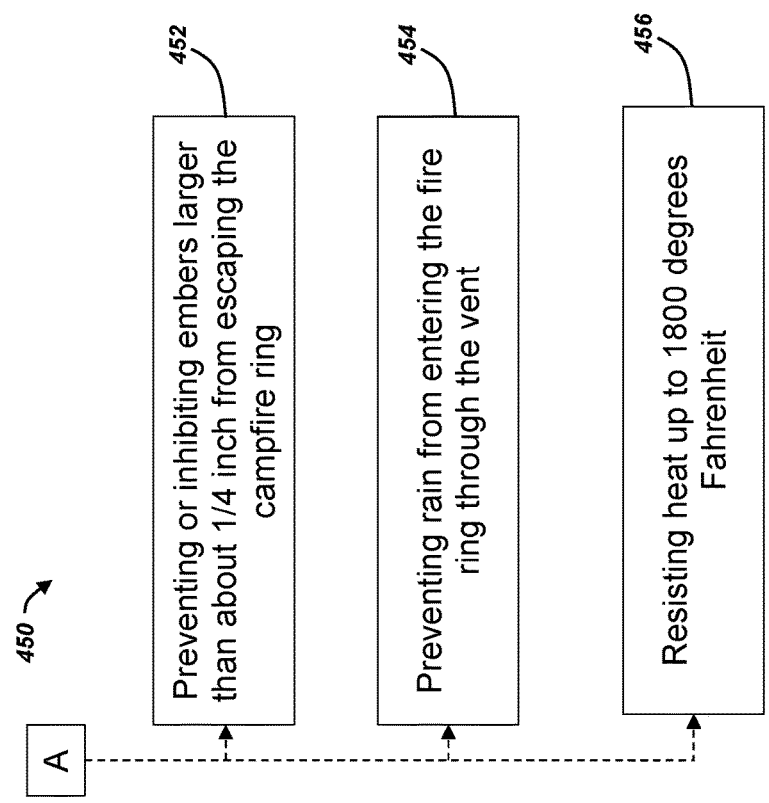
FIG. 9B is a flow chart of various steps which may be used in connection with the method shown in FIG. 9A.

With reference next to FIGS. 9A-9B, an embodiment of a method 400 of applying a vented fire tarp, such as vented fire tarps 100, 200, to a fire is illustrated. At step 402, the vented fire tarp can be positioned over the fire, such as a campfire within a campfire ring, to cover the fire. In some embodiments, one or more vents of the vented fire tarp can be located over the fire. At step 404, the vented fire tarp can be secured relative to the fire. In some embodiments, this can include coupling the vented fire tarp to a ground surface adjacent the fire via one or more securing devices. For example, the vented fire tarp can be coupled to the ground surface via one or more fasteners such as stakes or spikes. In some embodiments, the one or more fasteners can be passed through holes or apertures of the vented fire tarp. At step 406, the burn rate of fuel, such as wood, of the fire can be controlled. In some embodiments, this can include controlling airflow through one or more vents of the vented fire tarp. For example, this can include adjusting the vented area. In embodiments having one or more flaps, such as flaps 108, such adjustment can be achieved by positioning the flaps in a fully open, partially open, or fully closed position with respect to one or more vents. In embodiments having a pinwheel vent, such as pinwheel vent 206, this can be achieved by moving an adjustment member, such as adjustment member 210, towards a fully open, partially open, or fully closed position.

In some embodiments, the method 400 can include a step of positioning a stake within, such as fire stake 300, within the fire. This can beneficially create a pitched area to increase air entrainment and reduce the likelihood that the tarp directly contacts the fuel source. See, for example, FIGS. 6-7 which illustrate the use of vented fire tarp 200 in conjunction with a fire stake 300 to create a pitched area.

In some embodiments, the method 400 can include one or more additional steps described in method 450. The method 450 can include a step 452 which can include preventing or inhibiting embers larger than about ¼ inch from escaping the campfire ring. The method 400 can include a step 454 which can include preventing rain from entering the fire ring through the vent. For example, in embodiments having flaps, such as flaps 108, the flaps can be positioned to cover the one or more vents. In embodiments having a pinwheel vent, such as pinwheel vent 206, this can be achieved by rotating an adjustment member, such as adjustment member 210, to cover the openings of the pinwheel vent. The method 400 can include a step 4456 which can include resisting heat up to 1800 degrees Fahrenheit. In some embodiments, the method 400 can include a step of removing the vented fire tarp With reference next to FIG. 10, an embodiment of a method 500 of removing a vented fire tarp, such as vented fire tarps 100, 200, from a fire is illustrated. At step 502, at least a portion of the vented fire tarp can be decoupled from the ground surface. For example, in embodiments where the vented fire tarp is coupled to the ground surface via multiple stakes or spikes, one or more of the stakes or spikes can be removed. In some instances, all stakes or spikes, except those on one side of the fire tarp, can be removed. At step 504, at least a portion of the vented fire tarp can be reversed such that the bottom side of the portion is exposed and facing upwardly and a top side of the portion is facing downwardly. This can beneficially reduce the temperature of the bottom side of the vented fire tarp. In instances where the vented fire tarp is at least partially coupled to the ground surface, such as along a single side, the vented fire tarp can be reversed by lifting the opposite side and folding it over the coupled side. In effect, the coupled side can serve as a "hinge" with the ground surface. In some embodiments, the vented fire tarp can be at or about ambient temperature within approximately one minute after reversal of the vented fire tarp. At step 506, the vented fire tarp can be fully decoupled from the ground surface. The vented fire tarp can then be stored for later use. Any or all of these steps can be provided in one or more instructions to a user, such as in a video or in an oral explanation or in a written manual or in writing on the fire tarp 100, 200.

As noted above, the vented fire tarps 100, 200 described herein can control the burn rate of an underlying fire by adjusting the vent area. Adjustment of the vent area can adjust the amount of oxygen being supplied to the fire, thereby controlling the rate of combustion or burning. This can advantageously conserve the fuel source, such as wood. In some embodiments, depending on the type and amount of fuel, weather conditions, and the vent conditions, the underlying fire can last at least about 6 hours and/or less than or equal to about 10 hours, or longer.

Moreover, the vented fire tarps 100, 200 can advantageously allow the underlying fire to smolder by providing a heat barrier and controlling radiant heat such that the volume under the tarp 100, 200 is at a temperature higher than air temperature. This can advantageously allow the underlying fire to be restarted with little to no work. For example, in some instances, the fire can be restarted simply by removing the fire tarp and/or via minor tending to the fire. In contrast, in situations where the fire is quenched or extinguished using water, dirt, or a combination thereof, a substantial amount of work is needed to restart the fire. For example, the underlying fuel source may need to be wholly replaced, due to water and/or dirt from the prior extinguishing. This can also potentially increase the total amount of fuel used to maintain the fire over multiple periods of use and non-use.

Accordingly, the vented fire tarps 100, 200 can be beneficially used in any situation in which a fire is to be used over an extended period time, such as throughout the day, the week, the month, or longer. While the vented fire tarps 100, 200 have been discussed above in some examples regarding campfires at a campsite, it is to be understood that the vented fire tarps 100, 200 can be used in other situations and environments. For example, the vented fire tarps 100, 200 can be used in domiciles with cooking and/or heating stoves. For example, in some situations, a fire can essentially be maintained continuously or perpetually in either a flaming state or a smoldering state for extended periods of many hours, or even days or weeks or months, covered by the fire tarp 100, 200 when not in use, and uncovered temporarily for periods of use, such as for cooking each meal in a home or restaurant or other venue, or for ambient heating, such as in the evening hours when the sun goes down and ambient temperature drops. The fire tarps 100, 200 can be useful in any domiciles that rely or depend on a burning fire for cooking and/or warmth, especially in climates where it rains often, which would otherwise require frequent restarting of the fire. The reduction in time needed to restart fires, or the elimination of the need to restart fires, can advantageously allow the user to spend more time on other activities. Also, the reduced need for matches, kindling, or tinder (along with the corresponding decrease in smoke which is otherwise caused by such materials) can lower the overall cost and annoyance of a fire. Moreover, the potential reduction in total fuel usage that would otherwise be required to maintain a perpetually flaming fire between uses for cooking and/or ambient heating can reduce overall costs for the domicile.

In some embodiments, the vented fire tarps 100, 200 can withstand average temperatures in the range of the tarp itself of at least about 1000° Fahrenheit and/or less than or equal to about 1800° Fahrenheit, such as about 1650° Fahrenheit. In some embodiments, the vented fire tarps 100, 200 can withstand average temperatures that are less than or higher than these ranges. In some embodiments, the vented fire tarps 100, 200 can withstand such temperatures for an extended period of multiple hours, such as for at least about six hours or at least about eight hours, or virtually indefinitely. The vented fire tarps 100, 200 can be designed for use with fires which utilize wood as the fuel source. However, it is believed that the vented fire tarps 100, 200 can be formed from other materials which can be used with fires that utilize other fuel sources, such as chemical-based or petroleum-based fuels.

In some embodiments, to facilitate use of the vented fire tarps 100, 200, the vented fire tarps 100, 200 can include notations. For example, the vented fire tarps 100, 200 can include notations to indicate which side of the vented fire tarp 100, 200 is intended to be positioned over an underlying fire. As another example, the vented fire tarps 100, 200 can include notations which walk a user through the steps for using the vented fire tarps 100, 200.

While certain materials have been described in connection with vented fire tarps 100, 200, it is to be understood that the components defining any vented campfire tarp may be formed of any of many different types of materials or combinations. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

In some embodiments, the fire tarp 100, 200 can include indicators, such as words or symbols, that are provide on the tarp 100, 200 (such as by printing or embossing or painting or in some other suitable way) to indicate information about how to use the tarp 100, 200 or to provide one or more warnings regarding the tarp 100, 200. For example, in some embodiments, the lower face of the bottom side of the fire tarp 100, 200 can indicate that it should be oriented down or toward the fire during use (e.g., "This Side Toward Fire" or "This Side Down") and/or the upper face of the top side of the fire tarp 100, 200 can indicate that it should be oriented up or away from the first during use (e.g., "This Side Away From Fire" or "This Side Up").

Furthermore, the components defining any vented campfire tarp may be purchased pre-manufactured or manufactured separately and then assembled together. However, any or all of the components may be manufactured simultaneously and integrally joined with one another. While certain methods of manufacture have been described in connection with vented fire tarps 100, 200, it is to be understood that manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result, such as a desired function or result described in connection with the category of such value, amount, or characteristic.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The following is claimed:

1. A vented fire tarp assembly comprising:
   a vented fire tarp comprising:
      a base portion comprising a first side and a second side, the first side being configured to be positioned over a fire with the second side being positioned above the first side;
      a vent being coupled to the base portion, the vent being configured to allow air to pass through the vent from the first side of the base portion to the second side of the base portion; and
      a securing device being configured to allow the base portion to be coupled to a ground surface when the base portion is placed over the fire; and
   an adjustable fire stake being configured to be positioned within the fire, the adjustable fire stake comprising:
      a first member comprising a mounting body and a platform, the platform being movable relative to the mounting body; and
      a second member comprising a housing having a first end and a second end,
      wherein at least a portion of the mounting body is configured to be received within the housing with the platform contacting the first end of the housing.

2. The vented fire tarp assembly of claim 1, wherein the vent comprises a vent member and an adjustment member movable relative to the vent member.

3. The vented fire tarp assembly of claim 2, wherein the adjustment member is rotatable relative to the vent member.

4. The vented fire tarp assembly of claim 2, wherein the adjustment member is translatable relative to the vent member.

5. The vented fire tarp assembly of claim 2, wherein the vent member comprises a vented section comprising a plurality of openings.

6. The vented fire tarp assembly of claim 5, wherein the adjustment member is movable to expose at least a portion of the vented section.

7. The vented fire tarp assembly of claim 5, wherein the adjustment member is movable to a closed position in which the vented section is covered by the adjustment member.

8. The vented fire tarp assembly of claim 2, wherein the vent member comprises an unvented section having no openings.

9. The vented fire tarp assembly of claim 1, further comprising a stake, wherein the securing device is an aperture in the base portion and the stake is configured to be inserted through the aperture to secure the base portion in the ground surface.

10. The vented fire tarp assembly of claim 1, wherein the base portion comprises a body section and a side section.

11. The vented fire tarp assembly of claim 10, wherein the side section comprises an insulated material.

12. The vented fire tarp assembly of claim 1, wherein the first side of the base portion comprises a heat-resistant material.

13. The vented fire tarp assembly of claim 12, wherein the first side of the base portion comprises amorphous silica.

14. The vented fire tarp assembly of claim 1, wherein the second side of the base portion comprises a water-resistant or waterproof material.

15. The vented fire tarp assembly of claim 14, wherein the second side of the base portion comprises silicone resin.

16. The vented fire tarp assembly of claim 1,
    wherein the platform is attached to the first end of the housing.

17. The vented fire tarp assembly of claim 1, wherein the mounting body comprises a threaded portion and the platform comprises a correspondingly threaded portion, and wherein the platform is movable relative to the mounting body over the threaded portion.

18. The vented fire tarp assembly of claim 1, wherein the mounting body comprises a head portion.

19. A method of removing a vented fire tarp assembly from a fire, the method comprising:
    decoupling at least a portion of the vented fire tarp from a ground surface around the fire;
    removing an adjustable fire stake, the adjustable fire stake being configured to be positioned within the fire and comprising:
       a first member comprising a mounting body and a platform, the platform being movable relative to the mounting body; and
       a second member comprising a housing having a first end and a second end
       wherein at least a portion of the mounting body is configured to be received within the housing with the platform contacting the first end of the housing; and reversing at least a portion of the vented fire tarp such that a bottom side of the portion of the fire tarp is facing upwards and a top side of the portion of the fire tarp is facing downwards.

20. The method of claim 19, further comprising fully decoupling the vented fire tarp from the ground surface after reversing at least a portion of the vented fire tarp.

21. The method of claim 19, wherein decoupling at least a portion of the vented fire tarp comprises decoupling one or more side of the vented fire tarp from the ground surface around the fire.

22. The method of claim 19, wherein decoupling at least a portion of the vented fire tarp decoupling all but one side of the vented fire tarp from the ground surface.

23. The method of claim 19, wherein reversing at least a portion of the vented fire tarp comprises folding the vented fire tarp about a side secured to the ground surface.

\* \* \* \* \*